Patented June 6, 1933

1,913,164

UNITED STATES PATENT OFFICE

DAVID A. LEGG AND LEO M. CHRISTENSEN, OF TERRE HAUTE, INDIANA, ASSIGNORS TO COMMERCIAL SOLVENTS CORPORATION, OF TERRE HAUTE, INDIANA, A CORPORATION OF MARYLAND

PRODUCTION OF BUTYL ALCOHOL AND ACETONE BY FERMENTATION

No Drawing. Application filed July 18, 1930. Serial No. 468,994.

This invention relates to a process of producing butyl alcohol and acetone by fermentation. More particularly, it relates to such a process wherein pentoses are employed as raw materials for the fermentation.

The production of butyl alcohol and acetone by the fermentation of both amylaceous and saccharine carbohydrates by the aid of bacteria has been previously disclosed and discussed by a number of investigators. Previous investigators have also fermented pentoses such as xylose with butyl-acetonic bacteria. The procedures followed by these workers, however, are entirely inadequate and unsuited for commercial scale operation due to the low concentrations fermentable under the conditions employed and the cost of the pure grades of material used. It is the object of the present invention to overcome the disadvantages of previously disclosed processes and at the same time provide a feasible commercial process for the production of butyl alcohol and acetone by the fermentation of crude xylose.

Xylose is not readily available in the free state in nature but may be fairly easily obtained by the acid hydrolysis of numerous cellulosic materials such as corncobs, straw, oat hulls, cottonseed hulls, etc., as well as from many other sources. Xylose may be obtained by treating, for example, comminuted corncobs, with 2% or stronger sulfuric acid for 1–4 hours at a temperature of, say, 130° C. In this way, yields of 30–35% of reducing sugar, as xylose, are obtained in the form of a crude solution and 14–16% of crystalline xylose. Previous investigators have recovered and used as a source of butyl-acetonic fermentation only this purified crystalline fraction of the xylose produced. For this reason a large proportion of the available xylose was not utilized, with the result that the products thus obtained were too expensive to compete with similar products obtained from other sources. It has now been discovered that by suitable operating procedure all of this xylose may be employed with the production of satisfactory yields of n-butyl alcohol, acetone and other useful products.

Xylose possesses certain inherent properties which make its use for the production of butyl alcohol and acetone on a commercial scale highly unsatisfactory, but the disadvantages caused by these properties are largely overcome by following the procedures which are disclosed hereafter. For example, xylose, as well as the other pentoses, are very easily caramelized with the result that the necessary sterilization is difficult to obtain without very appreciable losses of the xylose. Another difficulty of equal importance results from the fact that xylose alone is not fermentable in practical concentrations without the addition of nutrient materials, the use of which ordinarily increases unduly the cost of the process in which xylose is employed. Furthermore, when using the xylose in a crude form it is necessary to add nutrients to it in such form as not to be unfavorably acted upon by materials present with the xylose. Certain difficulties are also experienced in employing the optimal concentrations of xylose.

It has now been discovered that the disadvantages inherent in the use of crude xylose in the production of butyl alcohol and acetone by fermentation may be largely overcome by adding to the xylose mash, suitable amounts of naturally occurring starchy carbohydrate, as for example, cereals such as maize, kaffir corn, wheat, etc. The use of a mash of such a composition coupled with a suitable sterilization procedure, such as that disclosed hereinafter, gives quite satisfactory results on a commercial scale. In practical operation this may be accomplished in a number of ways.

In the fermentation of starchy carbohydrates by butyl-acetonic bacilli concentrations of starch ranging from about 6% to 8% by weight are generally employed in order to obtain most satisfactory results in the way of completeness of utilization of the raw material, total production of solvents from a given fermenter capacity, etc. It is therefore desirable, in most cases, that the crude xylose liquor to be fermented be of about the same concentration as the starchy carbohydrate containing mash to be employed in the fermentation. This is not always necessary, however, as in some cases the operating procedure may be suitably modified so that higher or lower concentrations of xylose liquor may be used. For most satisfactory general operation, concentrations of 6.5–7.0 grams or higher of xylose per 100 c. c. of solution are preferred. Concentrations less than this require that proportionately higher concentrations of starchy mash must be prepared, which as above stated, are generally somewhat difficult to obtain. In addition to this disadvantage, mash containing less than 6.5–7.0 grams of xylose per 100 c. c. of solution ordinarily does not give as satisfactory results merely from the point of view of fermentability, such mash giving high acidity peaks during the fermentation and other results of an undesirable character.

The crude xylose liquor as produced is rather strongly acid and aseptic in character. In order to be utilizable in the butyl-acetonic fermentation process the acidity must first be reduced. This may be accomplished by the addition of a neutralizing agent such as, for example, calcium hydroxide in the form of milk of lime, calcium carbonate, soda ash, etc. Sufficient neutralizing agent is added to reduce the acidity of the xylose liquor to preferably within the limits pH 5.5 and 5.75. If the resulting liquor is more acid it usually exerts a harmful effect upon the iron metal from which the fermenters and other apparatus may be constructed; if on the other hand, it is more alkaline the tendency for the xylose to decompose increases.

After regulation of the hydrogen ion concentration the xylose liquor is preferably maintained under as aseptic conditions as possible in order to prevent the admission of contaminating organisms. Within this particular hydrogen ion concentration range there will generally be little or no growth of contaminating organisms, but it is generally desirable to subject the xylose liquor to sterilization before inoculating it with butyl-acetonic bacilli. As previously indicated, however, considerable care must be exercised to prevent excessive heating during sterilization of the xylose. The sterilization procedure may be suitably modified in a number of different ways. Water and the starchy material such as, for example, degerminated or undegerminated corn meal of 6% to 8% concentration by weight and the xylose liquor of approximately the same concentration may be sterilized separately, introduced into the fermentation vat, inoculated with butyl-acetone bacilli and allowed to ferment. In this case the corn meal is generally sterilized at 20 lbs. steam pressure for about two hours and the xylose liquor at the same pressure for about fifteen minutes. If the heating of the latter is allowed to continue for a longer period of time, an excessive amount of caramelization begins to take place. A second method of procedure is to sterilize the corn meal in the ordinary manner with the exception of the fact that the xylose liquor is introduced into the sterilizer with the sterilizing corn meal about fifteen minutes before the sterilization of the latter is complete. The sterilization of the mixture is then continued in the customary manner for an additional period of about fifteen minutes and then discharged from the sterilizer, cooled to about 98° F., inoculated with butyl-acetonic bacilli, and the fermentation completed in the usual manner. Still a third procedure has certain advantages over those just described. According to this method, the corn meal mash is sterilized, cooled, introduced into the fermenter, inoculated with butyl-acetonic bacilli, and fermentation allowed to proceed. After the mash is vigorously fermenting the xylose liquor may be added either in one lot or in several or, if preferred, it may be added continuously until the required amount has been introduced. When following such a method of operation, sterilization of the xylose liquor is not always required provided ordinary care is exercised to prevent the liquor from being too heavily inoculated with contaminating organisms. When following such a procedure losses by caramelization during sterilization are entirely avoided.

The table given below shows data illustrating the fermentation of corn meal mixed with varying amounts of crude xylose liquor obtained by the hydrolysis of coarsely ground corncob meal. Approximately 6–5% by weight of carbohydrate was used in each case. In figuring the yields, one pound of dry xylose was taken as equivalent to one pound of dry degerminated meal. It will be noted that in each case a control experiment with 100% degerminated corn meal was also run for the sake of comparison.

*Table*

| Exp. No. | % Xylose substituted | Total yield % | Acetone % | BuOH % | EtOH % |
|---|---|---|---|---|---|
| 1. Control | | 29.7 | 30.3 | 61.0 | 8.7 |
| Xylose | 8.4 | 31.7 | 34.0 | 58.5 | 7.5 |
| 2. Control | | 25.8 | 34.8 | 59.9 | 5.3 |
| Xylose | 10.0 | 26.9 | 36.8 | 60.5 | 2.7 |
| 3. Control | | 27.2 | 33.7 | 61.4 | 4.9 |
| Xylose | 15.0 | 30.3 | 35.0 | 63.8 | 1.2 |
| 4. Control | | 29.0 | 32.6 | 62.7 | 4.7 |
| Xylose | 20.0 | 29.3 | 33.8 | 62.7 | 3.4 |
| 5. Control | | 29.6 | 31.6 | 63.3 | 5.1 |
| Xylose | 24.0 | 29.1 | 35.4 | 60.7 | 3.9 |
| 6. Control | | 26.2 | 32.2 | 62.2 | 5.6 |
| Xylose | 25.0 | 24.7 | 33.6 | 62.0 | 4.4 |

Experiments Nos. 5 and 6 indicate that under the particular conditions of fermentation and sterilization employed in this series of experiments some caramelization of the xylose took place when the latter was present in concentrations of about 25%. By heating the xylose for a shorter period of time during sterilization and modifying the conditions of adding the xylose to the corn meal mash, it is possible to use satisfactorily still higher concentrations of xylose, it being possible under favorable conditions to substitute for corn meal or other starchy carbohydrate material as much as 40% to 50% of xylose.

In carrying out the present invention it is, of course, possible to deviate in a number of ways from the procedure outlined above without leaving the scope of the invention, and it is understood that it is desired to claim the usual equivalents which might naturally occur to one skilled in the art. For example, as the butyl-acetonic bacilli there may be employed any of the different bacteria which have been suggested for this purpose, such as *Clostridium acetobutylicum* (Weizmann), *B. butylicumaceticum*, *B. butylicum B. F.*, *B. granulobacter pectinovorum*, etc. Methods of producing the xylose liquor other than that described above may also be satisfactorily employed. Likewise, the method of sterilizing and the procedure involving the fermentation of the xylose may be varied considerably from the specific examples cited above without appreciably affecting the final results.

What is claimed is:

1. A process for the production of n-butyl alcohol and acetone by fermentation, which comprises preparing a mash containing as the fermentable carbohydrate, 50–99% comminuted maize and 50–1% xylose contained in the form of a xylose-containing hydrolysis liquor, inoculating said mash with butyl-acetonic bacilli, allowing fermentation to proceed, and recovering the products thereby formed.

2. A process for the production of n-butyl alcohol and acetone by fermentation which comprises preparing a mash containing as the fermentable carbohydrate, about 75% comminuted maize and about 25% xylose contained in the form of a xylose-containing hydrolysis liquor, inoculating said mash with butyl-acetonic bacilli, allowing fermentation to proceed, and recovering the products thereby formed.

3. In a process for the production of n-butyl alcohol and acetone by fermentation, the steps which comprise sterilizing a starchy carbohydrate material, adding xylose-containing hydrolysis liquor to said material when sterilization is nearly complete, completing the sterilization, inoculating with butyl-acetonic bacilli the mash thus produced, allowing fermentation to proceed, and recovering the products thereby formed.

4. In a process for the production of normal butyl alcohol and acetone by fermentation, the steps which comprise preparing a mash containing as the fermentable carbohydrate 50–99% comminuted maize and 50 to 1% xylose contained in the form of a xylose-containing hydrolysis liquor, inoculating said mash with butyl-acetonic bacilli and allowing fermentation to proceed.

5. In a process for the production of normal butyl alcohol and acetone by fermentation, the steps which comprise preparing a mash containing as the fermentable carbohydrate about 75% comminuted maize and about 25% xylose contained in the form of a xylose-containing hydrolysis liquor, inoculating said mash with butyl-acetonic bacilli and allowing fermentation to proceed.

6. In a process for the production of normal butyl alcohol and acetone by fermentation, the steps which comprise sterilizing a starchy carbohydrate material, adding a xylose-containing hydrolysis liquor to said material when sterilization is nearly complete, completing the sterilization, inoculating the mash thus produced with butyl-acetonic bacilli and allowing fermentation to proceed.

7. In a process for the production of normal butyl alcohol and acetone by fermentation, the steps which comprise sterilizing a starchy carbohydrate-containing mash, inoculating said mash with butyl-acetonic bacilli, after fermentation has begun adding a xylose-containing hydrolysis liquor to said fermenting mash and allowing fermentation to proceed.

8. In a process for the production of normal butyl alcohol and acetone by fermentation, the steps which comprise sterilizing a starchy carbohydrate-containing mash, adding thereto a xylose-containing hydrolysis liquor which has been sterilized by heating for the equivalent of approximately fifteen minutes at approximately twenty pounds steam pressure, inoculating the mash thus produced with butyl-acetonic bacilli and allowing fermentation to proceed.

9. In a process for the production of normal butyl alcohol and acetone by fermentation, the steps which comprise preparing a sterile starchy carbohydrate-containing mash, adding thereto a xylose-containing hydrolysis liquor containing not substantially less than 6 grams of xylose per 100 c.c. of solution, inoculating the mash thus produced with butyl-acetonic bacilli and allowing fermentation to proceed.

10. In a process for the production of normal butyl alcohol and acetone by fermentation, the steps which comprise preparing a sterile starchy carbohydrate-containing mash, adding thereto a xylose-containing hydrolysis liquor containing approximately 6.5 grams of xylose per 100 c. c. of solution, inoculating the mash thus produced with butyl-acetonic bacilli and allowing fermentation to proceed.

In testimony whereof we affix our signatures.

DAVID A. LEGG.
LEO M. CHRISTENSEN.